US012639918B2

(12) United States Patent
Tago et al.

(10) Patent No.: US 12,639,918 B2
(45) Date of Patent: May 26, 2026

(54) MEDIUM, METHOD, AND DEVICE FOR OUTPUTTING ESTIMATION BASIS BASED ON GROUPS DIVIDED FROM INPUT DATA

(71) Applicant: Fujitsu Limited, Kawasaki (JP)

(72) Inventors: Shinichiro Tago, Shinagawa (JP); Masato Kitajima, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 407 days.

(21) Appl. No.: 18/062,104

(22) Filed: Dec. 6, 2022

(65) Prior Publication Data

US 2023/0290116 A1 Sep. 14, 2023

(30) Foreign Application Priority Data

Mar. 8, 2022 (JP) ................................. 2022-035392

(51) Int. Cl.
*G06V 10/764* (2022.01)
*G06V 10/771* (2022.01)
(Continued)

(52) U.S. Cl.
CPC .......... *G06V 10/764* (2022.01); *G06V 10/771* (2022.01); *G06V 10/774* (2022.01); *G06V 10/776* (2022.01)

(58) Field of Classification Search
CPC .. G06V 10/764; G06V 10/771; G06V 10/774; G06V 10/776; G06N 3/08; G06N 20/00; G06N 5/022
See application file for complete search history.

(56) References Cited

U.S. PATENT DOCUMENTS 11,144,825 B2 * 10/2021 Liu ........................ G16H 50/20
11,151,450 B2 * 10/2021 Zoldi ..................... G06N 5/045
(Continued)

FOREIGN PATENT DOCUMENTS

JP 2020-123164 A 8/2020

OTHER PUBLICATIONS

Chen, Chaofan, et al. "This looks like that: deep learning for interpretable image recognition." Advances in neural information processing systems 32 (2019). (Year: 2019).*
(Continued)

*Primary Examiner* — Henok Shiferaw
*Assistant Examiner* — Toluwani Mary-Jane Ijaseun
(74) *Attorney, Agent, or Firm* — Fujitsu Intellectual Property Center

(57) ABSTRACT

A non-transitory computer-readable recording medium has stored therein an information processing program causes a computer to execute a process comprising, dividing input data including a plurality of items related to data to be estimated that is a target of an estimation process using a machine learning model into a plurality of groups based on a predetermined condition; acquiring, for each of the plurality of groups, a first estimation result by a machine learning model that has already been trained, based on the input data included in the each of the plurality of groups; and outputting estimation result information indicating a basis for estimation of a second estimation result that is an estimation result of the data to be estimated, based on the first estimation result of each of the plurality of groups and the second estimation result.

5 Claims, 10 Drawing Sheets

(51) Int. Cl.
    *G06V 10/774*       (2022.01)
    *G06V 10/776*       (2022.01)

(56)       References Cited

U.S. PATENT DOCUMENTS

| | | | | |
|---|---|---|---|---|
| 2015/0178596 | A1* | 6/2015 | Bengio | G06N 20/00 |
| | | | | 382/224 |
| 2017/0032247 | A1* | 2/2017 | Tadesse | G06N 20/00 |
| 2019/0159737 | A1 | 5/2019 | Buckler et al. | |
| 2020/0134386 | A1* | 4/2020 | Lee | G06N 20/00 |
| 2020/0242489 | A1 | 7/2020 | Hama et al. | |
| 2021/0216901 | A1* | 7/2021 | Takano | G06N 20/00 |
| 2022/0019911 | A1* | 1/2022 | Zhou | G06N 5/04 |
| 2022/0027737 | A1* | 1/2022 | Dalli | G06N 3/049 |
| 2022/0058531 | A1* | 2/2022 | Ding | G06N 20/00 |
| 2022/0067520 | A1* | 3/2022 | Dalli | G06N 20/00 |
| 2022/0076058 | A1* | 3/2022 | Nakamura | G06F 18/214 |
| 2022/0138532 | A1* | 5/2022 | Dalli | G06N 3/048 |
| | | | | 706/27 |
| 2024/0037449 | A1* | 2/2024 | Yamaguchi | G06N 20/10 |
| 2024/0256836 | A1* | 8/2024 | Fukushi | G06N 20/00 |

OTHER PUBLICATIONS

Marco Tulio Ribeiro et al., "-Why Should I Trust You?—Explaining the Predictions of Any Classifier", In Proceedings of the 22nd ACM SIGKDD International Conference on Knowledge Discovery and Data Mining, ISBN: 978-1-4503-4232-2/16/08, DOI: http://dx.doi.org/10.1145/2939672.2939778, pp. 1135-1144, Aug. 13, 2016. (Total 10 pages).

Extended European Search Report dated Jun. 30, 2023 for corresponding European Patent Application No. 22211673.3, 8 pages.

Masaru, Fuji et al., "Explainable AI Through Combination of Deep Tensor and Knowledge Graph", Fujitsu Scientific & Technical Journal, vol. 55, No. 2, pp. 58-64, Jan. 1, 2019, Retrieved from the Internet: https://www.fujitsu.com/global/documents/about/resources/publications/fstj/archives/vol55-2/paper14.pdf [Retrieved on Jun. 20, 2023], XP093055920.

JPOA—Japanese Office Action mailed on Aug. 12, 2025 for Japanese Patent Application No. 2022-035392, with English translation (5 pages).

* cited by examiner

| | SHOP-LIFTING | GAZING | PICKING UP | TRYING | STROLL-ING | FALLING DOWN | CONSID-ERATION |
|---|---|---|---|---|---|---|---|
| DIVIDED FEATURE GRAPH 101 | 0.6 | 0.1 | 0.1 | 0.1 | 0.8 | 0.3 | 0.3 |
| DIVIDED FEATURE GRAPH 102 | 0.5 | 0.6 | 0.3 | 0.3 | 0.3 | 0.6 | 0.6 |
| DIVIDED FEATURE GRAPH 103 | 0.1 | 0.5 | 0.3 | 0.3 | 0.1 | 0.5 | 0.3 |
| DIVIDED FEATURE GRAPH 104 | 0.7 | 0.6 | 0.8 | 0.5 | 0.1 | 0.1 | 0.3 |
| DIVIDED FEATURE GRAPH 105 | 0.5 | 0.3 | 0.3 | 0.1 | 0.1 | 0.6 | 0.3 |
| TOTAL | 2.4 | 2.1 | 1.8 | 1.3 | 1.4 | 2.1 | 1.8 |

FIG.10

MEDIUM, METHOD, AND DEVICE FOR OUTPUTTING ESTIMATION BASIS BASED ON GROUPS DIVIDED FROM INPUT DATA

CROSS-REFERENCE TO RELATED APPLICATION

This application is based upon and claims the benefit of priority of the prior Japanese Patent Application No. 2022-035392, filed on Mar. 8, 2022, the entire contents of which are incorporated herein by reference.

FIELD

The embodiment discussed herein is related to an information processing program, an information processing method, and an information processing device.

BACKGROUND

In recent years, various systems using Artificial Intelligence (AI)-based estimation have been actively implemented in various fields such as medicine and finance. The AI-based estimation is sometimes referred to as classification. While techniques using the AI-based estimation are spreading in this way, with a black-box AI such as deep learning, it is difficult to understand the basis for estimation that indicates how the estimation is carried out.

In a certain area, not only obtaining the estimation result, but also understanding how the estimation is carried out is important. For example, in the medical field, not only predicting a disease of a patient and telling only the disease name, but also providing the basis for judging the disease is important. More specifically, doctors and patients may be convinced by clarifying which area of an X-ray image was paid attention to for the estimation. Thus, to convince people of the given estimation, it is important to share the basis for estimation including the procedure of the estimation.

Conventionally, various methods have been studied to clarify the basis for estimation made by the AI as described above. For example, a technique of assigning a contribution degree leading to the estimation result to a feature value has been developed. In the technique described above, there is a technique that provides the minimum feature value leading to the estimation result as the basis for estimation. In this method, a pseudo model of black-box machine learning is created to explain the basis for estimation. Specifically, an estimation device creates a linear model by sampling data around a target sample and performing training using a correct answer set obtained through prediction. Then, the estimation device outputs a feature value used in the estimation in the form of a contribution degree. In such an estimation device, due to the nature of the algorithm to be operated, a very small portion of the feature value established by the surrounding data of the estimation result during the estimation procedure can be easily provided as a contribution degree.

Moreover, there is a technique that calculates a prediction result of input data and a contribution value of each feature value, specifies an interpretation factor using interpretation factor conversion information for managing the interpretation factor defined by the contribution value of the feature value, and provides the specified interpretation factor. Furthermore, there is a technique that identifies and quantifies biological properties and analytes from image data, and identifies the medical condition based on the quantified biological properties and analytes. The related technologies are described, for example, in Japanese Laid-open Patent Publication No. 2020-123164 and U.S. Patent Application Publication No. 2019/0159737, and M. T. Ribeiro et al: "Why Should I Trust You?: Explaining the Predictions of Any Classifier," In Proceedings of the 22nd ACM SIGKDD International Conference on Knowledge Discovery and Data Mining, pp. 1135-1144, 2016. doi:10.1145/2939672.2939778.

SUMMARY

According to an aspect of an embodiment, a non-transitory computer-readable recording medium stores therein an information processing program that causes a computer to execute a process including: dividing input data including a plurality of items related to data to be estimated that is a target of an estimation process using a machine learning model into a plurality of groups based on a predetermined condition, acquiring, for each of the plurality of groups, a first estimation result by a machine learning model that has already been trained, based on the input data included in the each of the plurality of groups, and outputting estimation result information indicating a basis for estimation of a second estimation result that is an estimation result of whole data to be estimated, based on the first estimation result of each of the plurality of groups and the second estimation result.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a block diagram of an information processing device according to an embodiment;

FIG. 2 is a diagram illustrating a feature graph representing human behavior in commercial facilities;

FIG. 4 is a diagram illustrating an example of a classification score in each of the divided feature graphs;

FIG. 10 is a block diagram of an information processing device according to a third modification.

DESCRIPTION OF EMBODIMENTS

Figure 3:
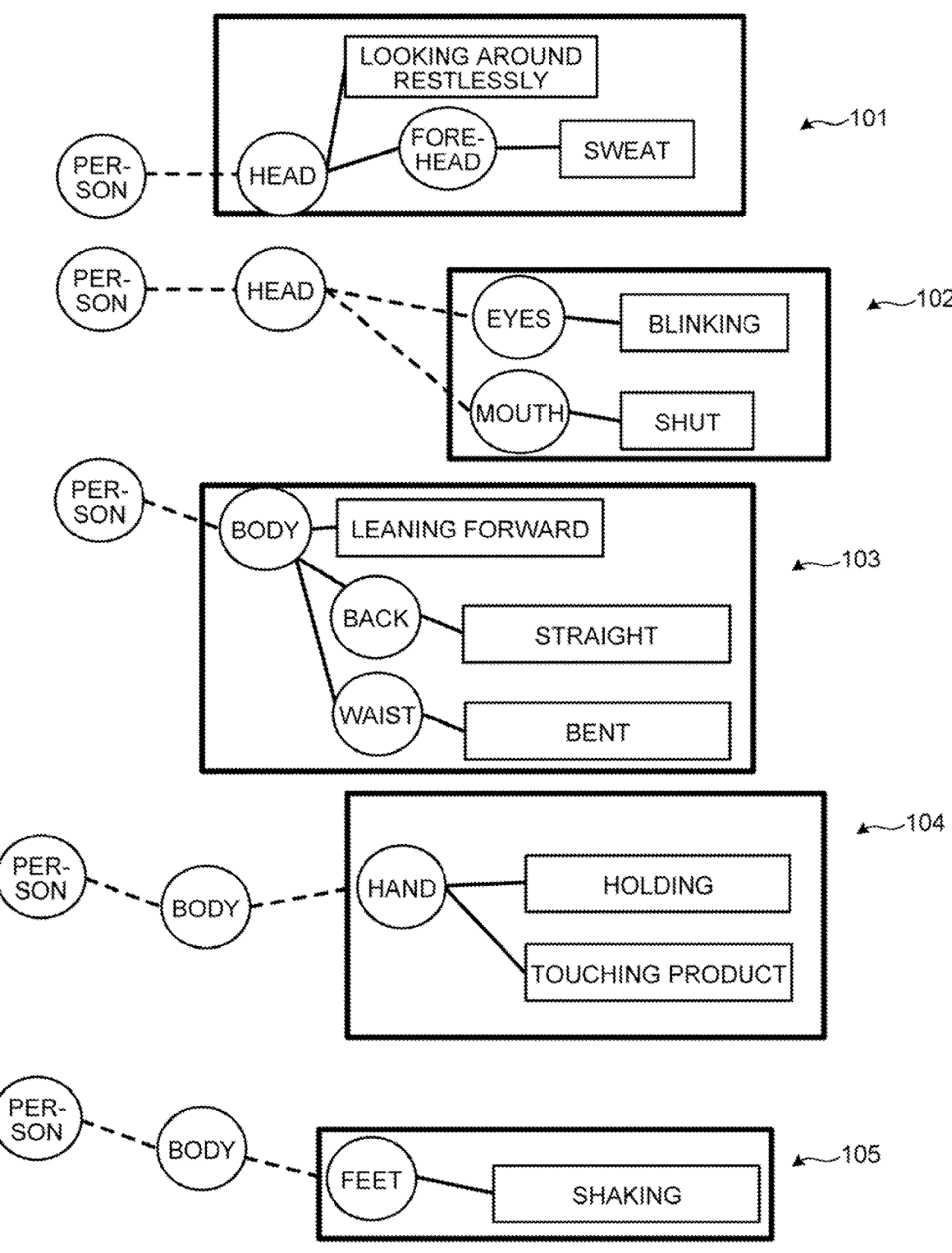
FIG. 3 is a diagram for explaining how the feature graph is divided.

However, in the technique that provides the minimum feature value leading to the estimation result as the basis for estimation, only a portion of what makes the estimation possible is captured and explained, which is not persuasive enough. For example, in this technique, eyes and ears may be presented as the basis for explaining a picture of a cat as being a cat, or only a portion of an image of the number 5 may be presented to explain the basis for the number 5. In this technique, if estimation can be performed by a specific feature, even if other features may be used as an explanatory supplement, the other features will not be used for explanation. Moreover, in the technique that identifies the medical condition based on the quantified biological properties or analytes obtained from image data, the basis for estimation is not provided. In addition, in the technique that specifies the interpretation factor based on the prediction result of input data and the contribution degree of each feature value, a method for providing the feature that has directly contributed to the estimation and the feature other than the surrounding features as the basis for estimation is not disclosed. Thus, it is difficult to sufficiently ensure persuasiveness and reliability as the basis for estimation, even by using these techniques.

Preferred embodiments of the present invention will be explained with reference to accompanying drawings. However, the information processing program, the information processing method, and the information processing device disclosed in the present application are not limited to the following embodiment.

Figure 1:
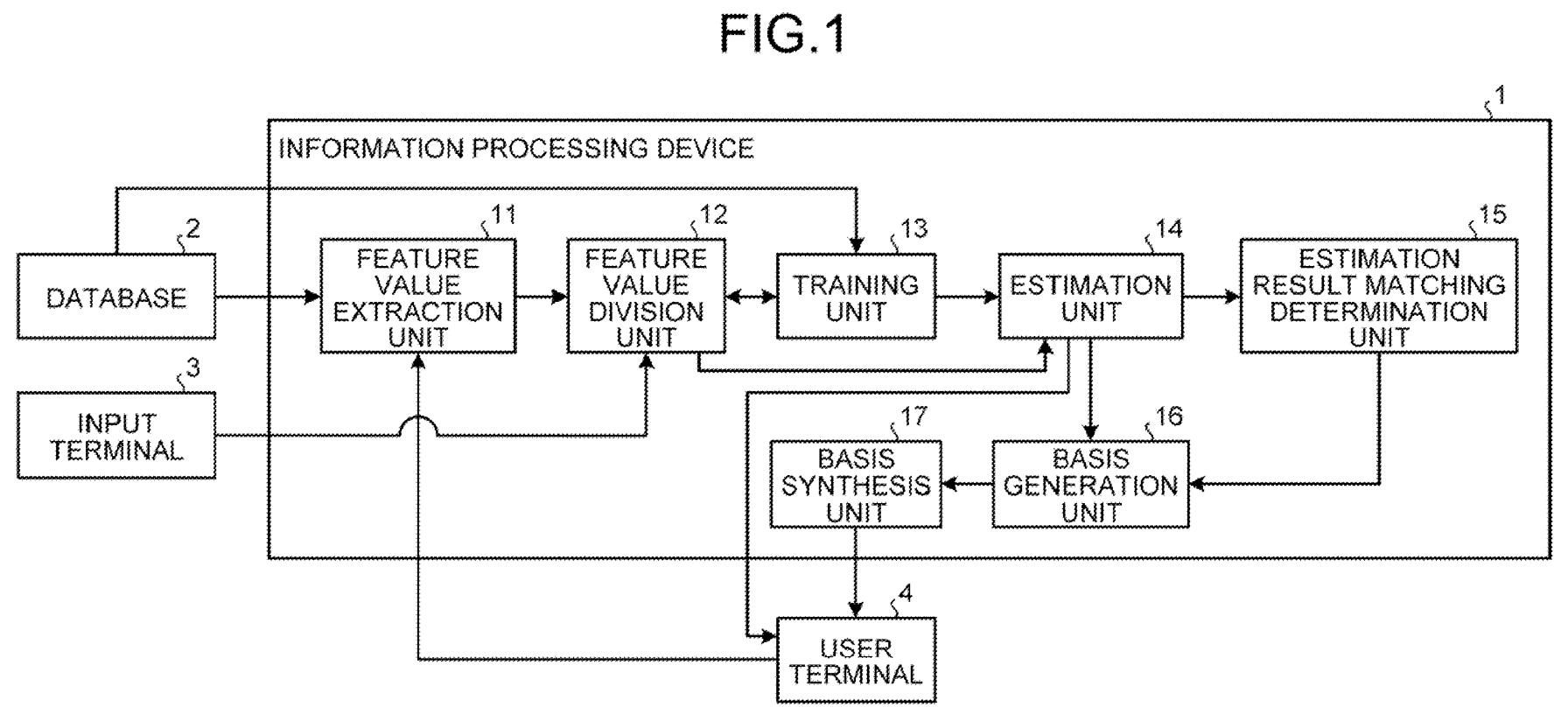

FIG. 1 is a block diagram of an information processing device according to an embodiment. As illustrated in FIG. 1, an information processing device 1 according to the present embodiment includes a database 2, an input terminal 3, and a user terminal 4.

In a training phase, an information processing device 1 performs training using training data acquired from the database 2 and information input from the input terminal 3, and generates a machine learning model that has already been trained used for estimation. Subsequently, in an estimation phase, the information processing device 1 performs estimation on data to be estimated input from the user terminal 4, using the machine learning model that has already been trained. In addition, the information processing device 1 generates information on the basis of the estimation result. Then, the information processing device 1 transmits the estimation result and information on the basis of the estimation result, to the user terminal 4.

To perform estimation on the given data to be estimated using deep learning, the information processing device 1 obtains a feature value on each part (portion) from which features of the data to be estimated is obtained, and performs estimation using the obtained feature value. When estimation is performed in such a manner, the information processing device 1 performs estimation by extracting a feature value from each part according to a feature graph that is a collection of parts.

For example, a case when the information processing device 1 estimates human behavior in commercial facilities will now be described. In predicting human behavior in commercial facilities, there are various types of human behavior such as behavior of shoplifting, behavior of gazing at a product, behavior of picking up a product, and behavior of consideration.

Figure 2:
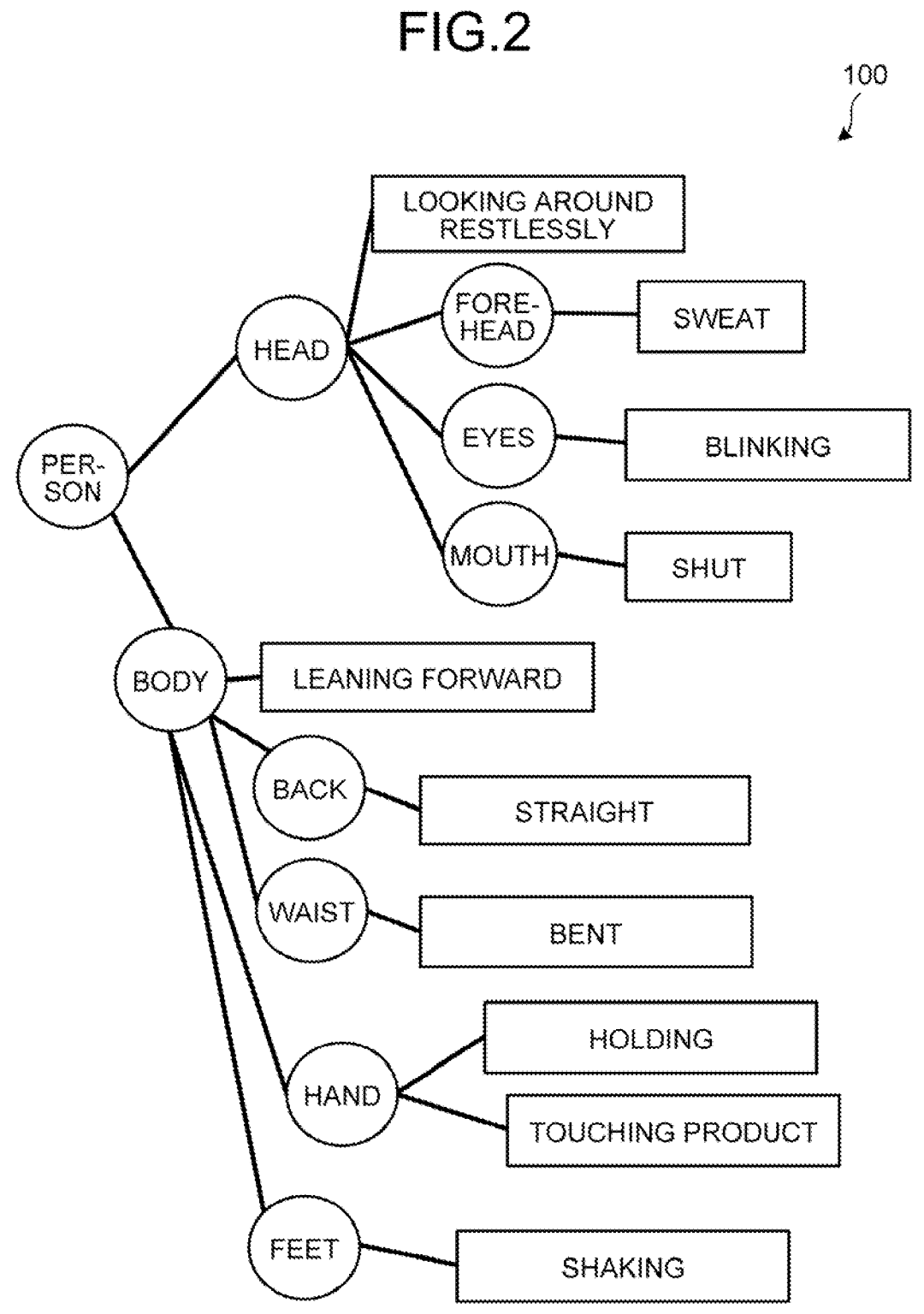

FIG. 2 is a diagram illustrating a feature graph representing human behavior in commercial facilities. A feature graph 100 representing human behavior in commercial facilities illustrated in FIG. 2 is represented by a tree with a hierarchical structure. In the feature graph 100, a "person" representing the entire people is set as the root information of the tree. Moreover, in the feature graph 100, "head" and "body" are set as first-stage parts from which a feature value of the person is acquired. In addition, in the feature graph 100, a "forehead", "eyes", and a "mouth" are set as second-stage parts from which a more detailed feature value is acquired than that included in the head serving as the first-stage part. Furthermore, in the feature graph 100, a "back", a "waist", a "hand", and "feet" are set as second-stage parts from which a more detailed feature value is acquired than that included in the body serving as the first-stage part. The part from which the feature value is acquired is not limited to the above. It is also possible to increase the hierarchy, or increase the number of parts set in each hierarchy. In the case of the feature graph illustrated in FIG. 2, with an increase in the hierarchy, a more detailed feature value can be obtained from the part. In the following description, the parts in each hierarchy such as the first-stage part and the second-stage part are collectively and simply referred to as a "part".

In addition, a feature value obtained in the part is added to each part. For example, in the case of the "head", a feature value representing "looking around restlessly" is added, and in the case of the "forehead", a feature value representing "sweat" is added. In the example in FIG. 2, the feature values are expressed in language for clarity, but in reality, the feature values are numerical information corresponding to the language. The parts and feature values in the data to be estimated are examples of input data including a plurality of items for the data to be estimated. Moreover, the parts and feature values in the training data correspond to examples of input data for training including the items related to the training data.

The database 2 stores therein training data used by the information processing device 1 for training. The training data in the present embodiment is a teacher training data with a correct answer label.

For example, the training data for estimating human behavior in commercial facilities is image data captured by cameras installed in the commercial facilities. To each piece of the image data in the training data, a correct answer label is assigned. The correct answer label indicates that the behavior captured in the image is one of various types of behavior including the "behavior of shoplifting", "behavior of gazing at a product", "behavior of picking up a product", "behavior of trying a product", "behavior of consideration", and the like.

The input terminal 3 is a device that inputs division definition to the information processing device 1. The division definition is information on how the feature graph is divided to provide the basis for estimation. The division definition includes a starting point definition path that is information indicating a path from the root of the part serving as the starting point of division, and a feature value definition pattern that is information on a path extending from the part at the starting point to a feature value that is toward a branch in the opposite direction from the root. The feature value definition pattern is information capable of specifying the configuration of the branch that extends from the starting point included after the division, by tracing the path registered in the pattern.

For example, the division definition is conditions for collecting the parts assumed to have similar functions, and the feature values of the parts. Having the similar functions means that the basis for estimation is similar. In other words, the division definition specifies a set of items to be the similar bases for estimation.

In the present embodiment, the division definition is created by an operator. However, the division definition may also be stored in advance in the database 2.

The user terminal 4 inputs data to be estimated that is a target of estimation by the information processing device 1, to the information processing device 1. Subsequently, the user terminal 4 receives the estimation result and information on the basis for estimation, from the information processing device 1. Then, the user terminal 4 provides the user with the estimation result and the information on the basis for estimation acquired from the information processing device 1.

Next, an operation of the information processing device 1 will be described in detail. The information processing device 1 includes a feature value extraction unit 11, a feature value division unit 12, a training unit 13, an estimation unit 14, an estimation result matching determination unit 15, a basis generation unit 16, and a basis synthesis unit 17.

In the training phase, the feature value extraction unit 11 acquires a plurality of pieces of training data from the database 2. Next, the feature value extraction unit 11 extracts a feature value from the training data using a multilayer neural network or the like, for each piece of the training data. Then, the feature value extraction unit 11 generates a tree representing the structure of the training data, using the parts from which a feature value is extracted, and generates a feature graph by associating the feature value with each of the parts. For example, the feature value extraction unit 11 generates the feature graph 100 illustrated in FIG. 2. Subsequently, the feature value extraction unit 11 outputs the generated feature graph of each piece of the training data to the feature value division unit 12.

Moreover, in the estimation phase, the feature value extraction unit 11 receives the input of data to be estimated from the user terminal 4. Then, as in the case of the training data, the feature value extraction unit 11 generates a feature graph for the data to be estimated, and outputs the generated feature graph to the feature value division unit 12.

In the training phase, the feature value division unit 12 receives the input of the feature graph obtained from each piece of the training data from the feature value extraction unit 11. Moreover, the feature value division unit 12 acquires the division definition input from the input terminal 3. FIG. 3 is a diagram for explaining how the feature graph is divided. Divided feature graphs 101 to 105 are a collection of parts that can be used as the basis for estimation in the estimation performed by using the feature graph 100 in FIG. 2. For example, the feature value division unit 12 acquires the division definition for generating the divided feature graphs 101 to 105.

Next, the feature value division unit 12 generates a divided feature graph for each feature graph in each piece of the training data, using the division definition. In this example, the division definition corresponds to an example of a "predetermined condition". Moreover, the divided feature graph generated from the feature graph of the training data corresponds to an example of a "training group". In other words, the feature value division unit 12 classifies the input data for training including the items related to the training data used for training the machine learning model, into a plurality of training groups based on a predetermined condition.

For example, the feature value division unit 12 generates a divided feature graph as follows. The feature value division unit 12 selects the division definitions one by one. Then, the feature value division unit 12 traces the passage from the root to the starting point using the starting point definition path included in the selected division definition, confirms the part at the starting point, and adds the confirmed part to the divided feature graph. Next, according to the feature value definition pattern included in the selected division definition, the feature value division unit 12 traces the path indicated by the feature value definition pattern from the starting point, confirms the part on the traced path, and adds the information on each path to the divided feature graph. Consequently, the feature value division unit 12 adds the information on the path linked from the starting point to each part, to the divided feature graph. In addition, the feature value division unit 12 adds the feature value corresponding to each part included in the divided feature graph, to the divided feature graph. Consequently, the feature value division unit 12 completes the generation of the divided feature graph corresponding to the selected division definition. The feature value division unit 12 performs the same process on all division definitions, and generates a divided feature graph for each of the division definitions. Because the same division definition is used for all feature graphs in the training data, each feature graph is divided in the same manner. Subsequently, the feature value division unit 12 outputs the generated divided feature graph of each piece of the training data to the training unit 13.

In this example, a specific example of generating the divided feature graph by the feature value division unit 12 is described with reference to the generation of the divided feature graph 101 in FIG. 3. The feature value division unit 12 acquires the feature graph 100 illustrated in FIG. 2 from the feature value extraction unit 11. Next, the feature value division unit 12 selects the division definition corresponding to the divided feature graph 101. Next, the feature value division unit 12 traces a starting point definition path representing a path from the "person" that is the root of the feature graph 100 included in the division definition to the "head" that is the starting point in the divided feature graph 101, confirms the passage to the "head", and registers the "head" in the divided feature graph 101 as the starting point. Next, the feature value division unit 12 acquires information on the path extending from the "head" that is the starting point in the divided feature graph 101, from the feature value definition pattern included in the division definition. Next, the feature value division unit 12 traces the path from the "head" that is the starting point, according to the acquired information on the path, confirms the "forehead" that is the part on the traced path, and adds the information on the path extending from the "head" to the "forehead" to the divided feature graph 101. In addition, the feature value division unit 12 adds information representing "looking around restlessly" and "sweat" that are the feature values of the "head" and "forehead" included in the divided feature graph 101, to the divided feature graph 101. In this manner, the feature value division unit 12 completes the divided feature graph 101. Similarly, the feature value division unit 12 generates divided feature graphs 102 to 105.

In the estimation phase, the feature value division unit 12 receives the input of the feature graph obtained from the data to be estimated, from the feature value extraction unit 11. Then, similar to the case of the feature graph obtained from the training data, the feature value division unit 12 generates a divided feature graph using the division definition. The divided feature graph generated from the feature graph of the data to be estimated corresponds to an example of a "group". In other words, the feature value division unit 12 divides the input data including the items related to the data to be estimated into a plurality of groups based on a predetermined condition. Subsequently, the feature value division unit 12 outputs the divided feature graph generated from the feature graph obtained from the data to be estimated, to the estimation unit 14.

The training unit 13 receives the input of a plurality of the divided feature graphs for each piece of the training data, from the feature value division unit 12. Moreover, the training unit 13 acquires the correct answer label of the training data from the database 2. Then, the training unit 13 performs training for each divided feature graph. In other words, the training unit 13 performs training on the machine learning model for each divided feature graph, and generates a machine learning model that has already been trained for each divided feature graph. Subsequently, the training unit 13 outputs the generated machine learning model that has already been trained for each divided feature graph, to the estimation unit 14.

The estimation unit 14 receives the input of the machine learning model that has already been trained for each divided feature graph, from the training unit 13. Subsequently, the estimation unit 14 receives the input of the divided feature graph generated from the feature graph obtained from the data to be estimated, from the feature value division unit 12.

Next, the estimation unit 14 performs estimation using a machine learning model for each divided feature graph, and calculates a classification score for each classification obtained as the estimation result. The classification score is a value indicating the probability of obtaining a correct answer for each of a plurality of classifications obtained as the estimation result of the given data. For example, the classification score is expressed in percentage in which 1 is given when all the answers are correct. The estimation result of each divided feature graph by the estimation unit 14 corresponds to an example of a "first estimation result".

Next, the estimation unit 14 sums up the classification scores calculated for the divided feature graphs in each classification. For example, the estimation unit 14 adds the classification scores for each classification and acquires the total result. Then, the estimation unit 14 sets the classification with the maximum total result, as the estimation result of the whole data to be estimated. The estimation result of the whole data to be estimated corresponds to an example of a "second estimation result". In other words, the estimation unit 14 determines the second estimation result based on the first estimation result. Subsequently, the estimation unit 14 transmits the estimation result to the user terminal 4. Moreover, the estimation unit 14 outputs the estimation result and the classification score for each classification in each divided feature graph to the estimation result matching determination unit 15.

FIG. 4 is a diagram illustrating an example of a classification score in each of the divided feature graphs. For example, a case of estimating human behavior in commercial facilities will now be described. In this example, estimation is performed using the feature graph 100 illustrated in FIG. 2 and the divided feature graph illustrated in FIG. 3.

The estimation unit 14 calculates the classification score illustrated in FIG. 4, as the classification score for each classification in each of the divided feature graphs 101 to 105. In this example, it is assumed that the classification to be estimated includes the "behavior of shoplifting", "behavior of gazing at a product", "behavior of picking up a product", "behavior of trying a product", "behavior of strolling", "behavior of falling down", and "behavior of consideration". Moreover, in this case, the classification score is expressed in percentage in which 1 is given when all the answers are correct without fail. For example, the classification score of the "behavior of shoplifting" in the divided feature graph 101 is 0.6.

The estimation unit 14 calculates and sums up the total of the classification scores of the divided feature graphs 101 to 105 for each classification. For example, the estimation unit 14 calculates 2.4 as the total result of the "behavior of shoplifting". Then, the estimation unit 14 determines the shoplifting with the highest value of the total result as the estimation result of the data to be estimated.

The estimation result matching determination unit 15 includes a determination threshold for determining which divided feature graph is to be used as the basis for estimation, from the match between the estimation result of the data to be estimated and the estimation result of each divided feature graph. For example, the estimation result matching determination unit 15 can use 0.4 as the determination threshold, in a case when the classification score is expressed in percentage in which 1 is given when all the answers are correct. In this case, when the determination threshold is equal to or greater than 0.4, the estimation result matching determination unit 15 determines that the estimation result of the divided feature graph matches with the estimation result of the data to be estimated, and adopts the determination threshold as the basis for estimation. That is, the estimation result matching determination unit 15 determines whether the estimation result of a certain divided feature graph matches with the estimation result of the data to be estimated at a probability of 40% or more.

The estimation result matching determination unit 15 receives the input of the estimation result and the classification score for each classification in each divided feature graph, from the estimation unit 14. Next, the estimation result matching determination unit 15 compares the classification score for the classification that matches with the estimation result of the data to be estimated in each divided feature graph and the determination threshold. If the classification score for the classification that matches with the estimation result of the data to be estimated in a certain divided feature graph is equal to or greater than the determination threshold, the estimation result matching determination unit 15 determines to adopt the divided feature graph as the basis for estimation. In this example, the divided feature graph adopted as the basis for estimation corresponds to an example of a "basis group". In other words, based on the first estimation result and the second estimation result, the estimation result matching determination unit 15 extracts the basis group that acquires the basis for estimation from the group. More specifically, the estimation result matching determination unit 15 acquires the classification score that indicates the probability of obtaining a correct answer for each classification in the first estimation result, and adopts the first estimation result in which the classification score for the classification that matches with the second estimation result is equal to or greater than a threshold, as the basis for estimation. Subsequently, the estimation result matching determination unit 15 notifies the basis generation unit 16 of the divided feature graph adopted as the basis for estimation.

For example, the process of the estimation result matching determination unit 15 when the classification score illustrated in FIG. 4 is used will now be described. In this example, it is assumed that the estimation result matching determination unit 15 has the determination threshold of 0.4. In this case, the estimation result matching determination unit 15 acquires the classification score of the behavior of shoplifting for each of the divided feature graphs 101 to 105, and compares the classification score with the determination threshold of 0.4. In this case, the classification score of the behavior of shoplifting in the divided feature graph 101 is 0.6, and is equal to or greater than 0.4. Therefore, the estimation result matching determination unit 15 adopts the divided feature graph 101 as the basis for estimation. Moreover, the classification score of the behavior of shoplifting in the divided feature graph 102 is 0.5, and is equal to or greater than 0.4. Therefore, the estimation result matching determination unit 15 adopts the divided feature graph 102 as the basis for estimation. Furthermore, the classification score of the behavior of shoplifting in the divided feature graph 104 is 0.7, and is equal to or greater than 0.4. Therefore, the estimation result matching determination unit 15 adopts the divided feature graph 104 as the basis for estimation. Still furthermore, the classification score of the behavior of shoplifting in the divided feature graph 105 is 0.5, and is equal to or greater than 0.4. Therefore, the estimation result matching determination unit 15 adopts the divided feature graph 105 as the basis for estimation. In contrast, the classification score of the behavior of shoplifting in the divided feature graph 103 is 0.1, and is less than 0.4. Therefore, the estimation result matching determination unit 15 does not adopt the divided feature graph 103 as the basis for estimation. In this case, the estimation result matching determination unit 15 notifies the basis generation unit 16 of the divided feature graphs 101, 102, 104 and 105 as the basis for estimation.

The basis generation unit 16 receives the notification of the divided feature graph adopted as the basis for estimation from the estimation result matching determination unit 15. Next, the basis generation unit 16 acquires the divided feature graph adopted as the basis for estimation from the estimation unit 14. Then, the basis generation unit 16 generates basis information that is information indicating the basis for estimation of each of the acquired divided feature graphs. In other words, the basis generation unit 16 generates the basis for estimation using the first estimation result in which the classification score for the classification that matches with the second estimation result is equal to or greater than the threshold. For example, the basis generation unit 16 acquires the contribution degree for the estimation of each feature value included in the divided feature graph adopted as the basis for estimation, from the estimation unit 14. Then, the basis generation unit 16 generates the basis information by extracting a partial graph based on the acquired contribution degree. Subsequently, the basis generation unit 16 outputs the basis information on each divided feature graph adopted as the basis for estimation, to the basis synthesis unit 17.

The basis synthesis unit 17 receives the input of the basis information on each divided feature graph adopted as the basis for estimation, from the basis generation unit 16. Then, the basis synthesis unit 17 synthesizes the acquired basis information, and generates estimation result information indicating the basis for estimation of the estimation result of the data to be estimated. Subsequently, the basis synthesis unit 17 transmits the estimation result information indicating the basis for estimation of the estimation result of the data to be estimated to the user terminal 4, and provides the user with the estimation result information.

Figure 5:
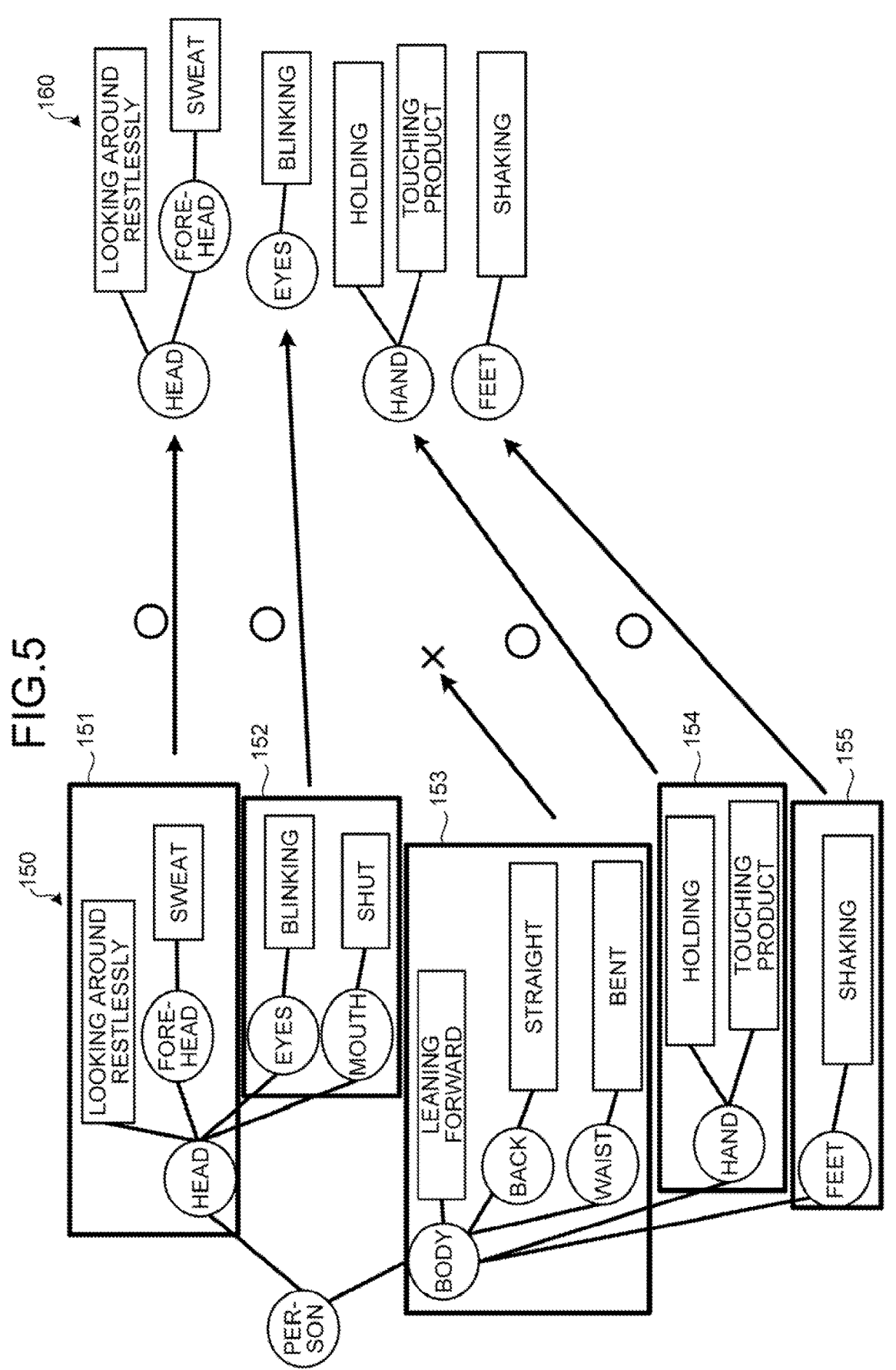
FIG. 5 is a diagram illustrating an outline of a determination process of the basis for estimation by the information processing device according to the embodiment.

FIG. 5 is a diagram illustrating an outline of a determination process of the basis for estimation by the information processing device according to the embodiment. The feature value extraction unit 11 acquires the data to be estimated, extracts feature values, and generates a feature graph 150 of the data to be estimated. Next, the feature value division unit 12 divides the feature graph 150 according to the division definition, and generates divided feature graphs 151 to 155.

Next, the estimation unit 14 performs estimation on the divided feature graphs 151 to 155 using the machine learning model that has already been trained corresponding to each of the divided feature graphs 151 to 155. Then, the estimation unit 14 sums up the classification scores for each classification in each of the divided feature graphs 151 to

155, and determines the classification with the highest score as the estimation result of the data to be estimated. In this example, the estimation unit 14 obtains the estimation result of the behavior of shoplifting for the data to be estimated.

Next, the estimation result matching determination unit 15 adopts the divided feature graph in which the classification score of the behavior of shoplifting is equal to or greater than the determination threshold, among the divided feature graphs 151 to 155, as the basis for estimation. In this example, the estimation result matching determination unit 15 adopts the divided feature graphs 151, 152, 154, and 155 as a basis for estimation 160. Subsequently, the basis generation unit 16 and the basis synthesis unit 17 generate estimation result information using the adopted basis for estimation 160.

Figure 6:
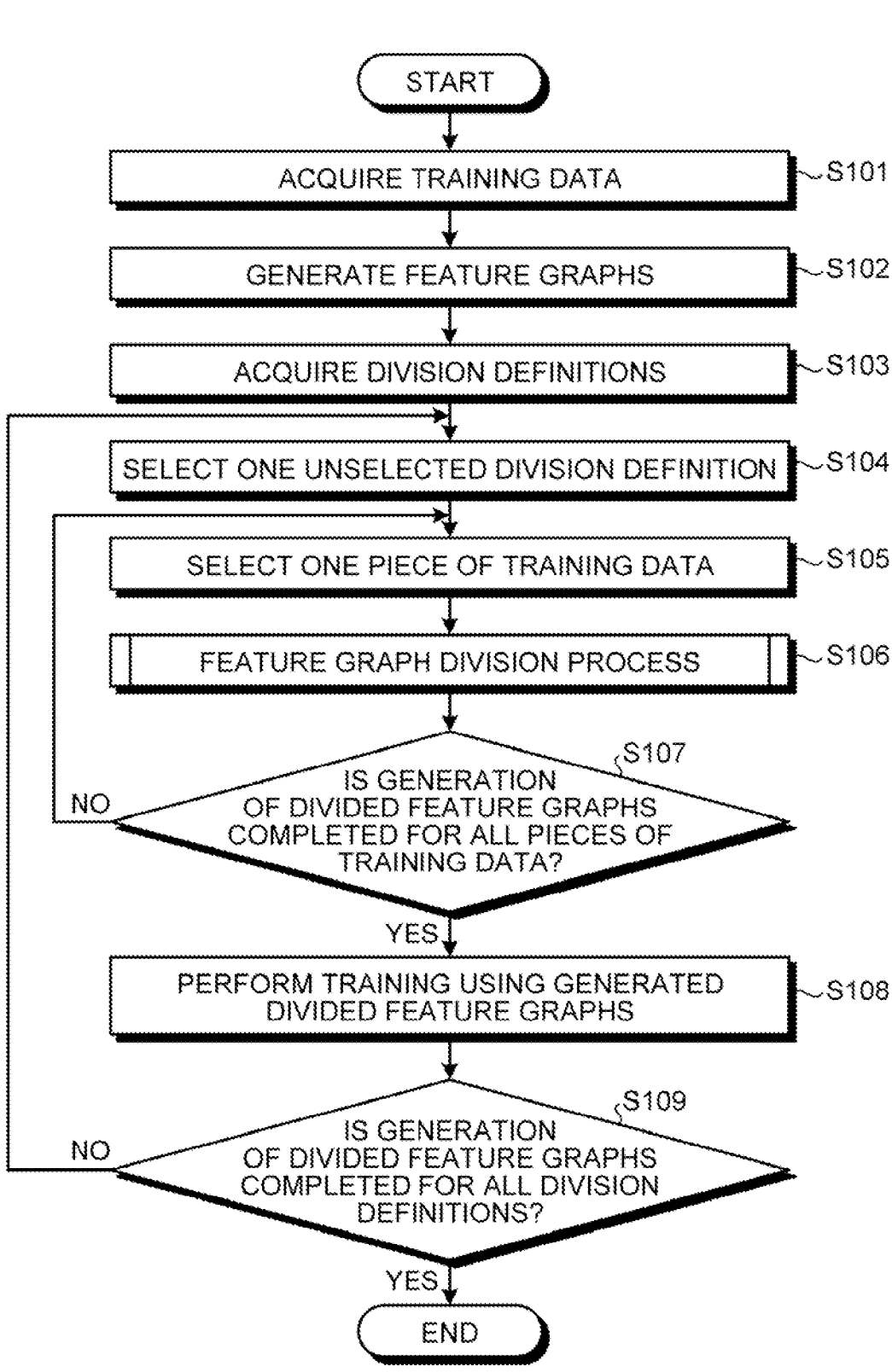
FIG. 6 is a flowchart of a training process by the information processing device in a training phase.

FIG. 6 is a flowchart of a training process by the information processing device in the training phase. Next, with reference to FIG. 6, the flow of the training process by the information processing device 1 in the training phase will be described.

The feature value extraction unit 11 acquires a plurality of pieces of training data from the database 2 (step S101).

Next, the feature value extraction unit 11 extracts a feature value of each piece of the training data, and generates a feature graph for each piece of the training data (step S102). Subsequently, the feature value extraction unit 11 outputs the generated feature graphs to the feature value division unit 12.

The feature value division unit 12 receives the input of the feature graph of each piece of the training data from the feature value extraction unit 11. Moreover, the feature value division unit 12 receives the input of division definitions from the input terminal 3, and acquires the division definitions (step S103).

Next, the feature value division unit 12 selects one division definition from unselected division definitions (step S104).

Next, the feature value division unit 12 selects one piece of the training data from the pieces of training data (step S105).

Next, the feature value division unit 12 executes the feature graph division process on the selected training data using the selected division definition (step S106). Consequently, the feature value division unit 12 acquires the divided feature graph corresponding to the selected division definition of the training data. The training unit 13 receives the input of the divided feature graph of the generated data to be estimated from the feature value division unit 12.

Next, the feature value division unit 12 determines whether the generation of the divided feature graph corresponding to the selected division definition is completed for all pieces of the training data (step S107). If there is still training data on which the generation of the divided feature graph corresponding to the selected division definition is not yet performed (No at step S107), the feature value division unit 12 returns to step S105.

In contrast, when the generation of the divided feature graphs corresponding to the selected division definition is completed for all pieces of the training data (Yes at step S107), the feature value division unit 12 completes the generation of the divided feature graphs. The training unit 13 acquires the correct answer for each piece of the training data from the database 2. Then, the training unit 13 performs training using the divided feature graphs acquired from the feature value division unit 12 and the correct answer (step S108). Subsequently, the training unit 13 outputs the machine learning model that has already been trained of the selected divided feature graph to the estimation unit 14.

Next, the feature value division unit 12 determines whether the generation of the divided feature graphs is completed for all the division definitions (step S109). If there is still a division definition on which the generation of the divided feature graphs is not yet performed (No at step S109), the feature value division unit 12 returns to step S104.

In contrast, when the generation of the divided feature graphs is completed for all the division definitions (Yes at step S109), the information processing device 1 terminates the training process.

Figure 7:
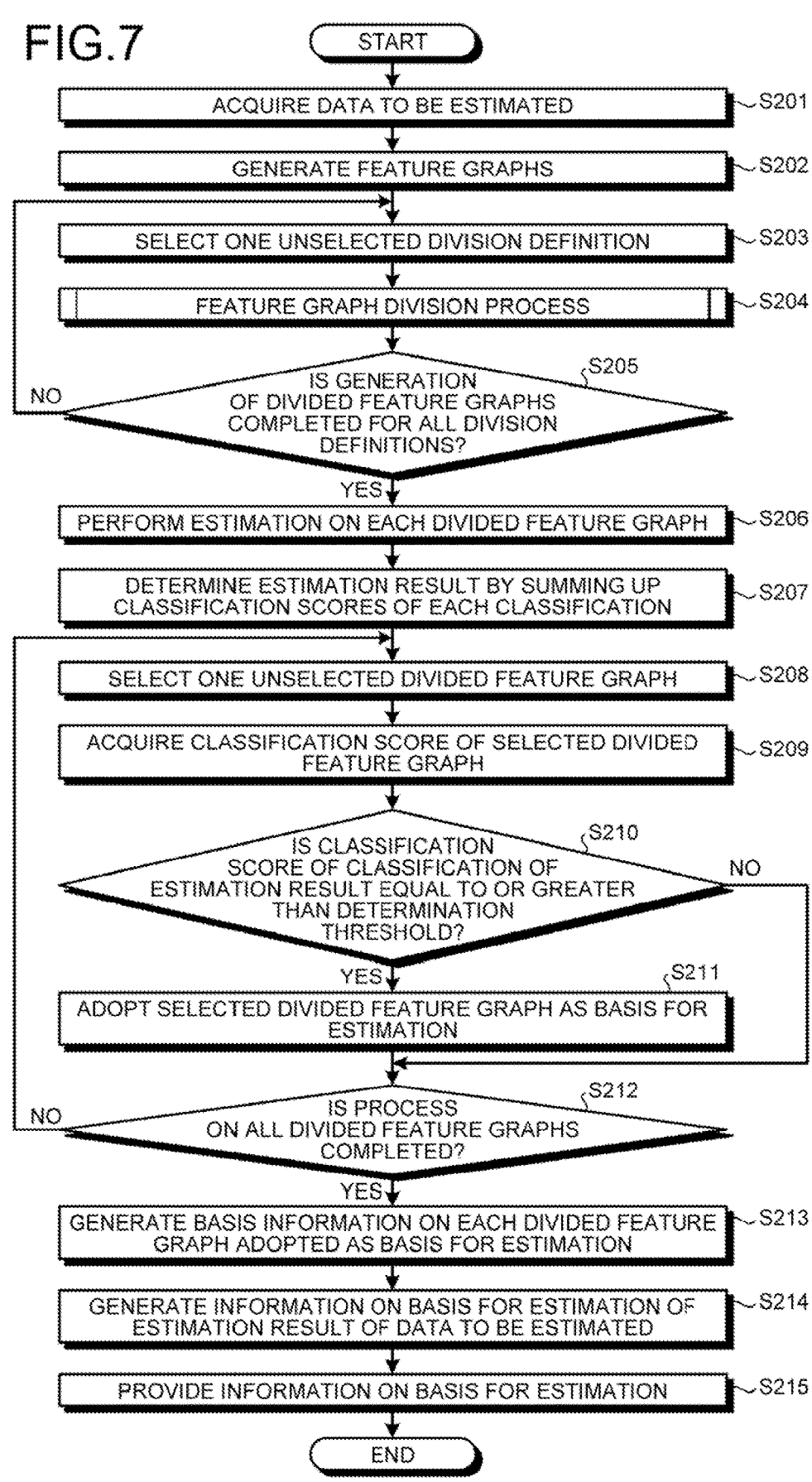
FIG. 7 is a flowchart of an estimation process by the information processing device in an estimation phase.

FIG. 7 is a flowchart of an estimation process by the information processing device in the estimation phase. Next, with reference to FIG. 7, the flow of the estimation process by the information processing device 1 in the estimation phase will be described.

The feature value extraction unit 11 acquires data to be estimated from the user terminal 4 (step S201).

Next, the feature value extraction unit 11 extracts feature values of the data to be estimated, and generates a feature graph for each piece of the data to be estimated (step S202). Subsequently, the feature value extraction unit 11 outputs the generated feature graphs to the feature value division unit 12.

Next, the feature value division unit 12 selects one division definition from unselected division definitions (step S203).

Next, the feature value division unit 12 executes the feature graph division process on the training data selected using the selected division definition (step S204). Consequently, the feature value division unit 12 acquires the divided feature graphs corresponding to the selected division definition of the data to be estimated.

Next, the feature value division unit 12 determines whether the generation of the divided feature graphs is completed for all division definitions (step S205). If there is still a division definition on which the generation of the divided feature graphs is not yet performed (No at step S205), the feature value division unit 12 returns to step S203.

In contrast, if the generation of the divided feature graphs is completed for all the division definitions (Yes at step S205), the estimation unit 14 receives the input of the divided feature graphs of the generated data to be estimated from the feature value division unit 12. The estimation unit 14 performs estimation on each divided feature graph of the data to be estimated using the machine learning model that has already been trained and acquired from the training unit 13 (step S206).

Next, the estimation unit 14 sums up the classification scores for each classification in the divided feature graphs, for each classification. Then, the estimation unit 14 determines the classification that has scored the highest total result, as the estimation result of the data to be estimated (step S207). Then, the estimation unit 14 outputs the classification score for each classification in the divided feature graphs and the estimation result of the data to be estimated, to the estimation result matching determination unit 15. Moreover, the estimation unit 14 transmits the estimation result of the data to be estimated to the user terminal 4, and provides the user with the estimation result.

The estimation result matching determination unit 15 acquires the classification score for each classification in the divided feature graphs and the estimation result of the data to be estimated, from estimation unit 14. Then, the estimation result matching determination unit 15 selects one divided feature graph from unselected divided feature graphs (step S208).

Next, the estimation result matching determination unit 15 acquires the classification score for each classification in the selected divided feature graph (step S209).

Next, the estimation result matching determination unit 15 determines whether the classification score for the classification of the estimation result in the selected divided feature graph is equal to or greater than the determination threshold (step S210). If the classification score for the classification of the estimation result in the selected divided feature graph is less than the determination threshold (No at step S210), the estimation result matching determination unit 15 proceeds to step S212.

In contrast, if the classification score for the classification of the estimation result in the selected divided feature graph is equal to or greater than the determination threshold (Yes at step S210), the estimation result matching determination unit 15 adopts the selected divided feature graph as the basis for estimation (step S211), and proceeds to step S212.

Subsequently, the estimation result matching determination unit 15 determines whether the determination process of the basis for estimation is completed for all the divided feature graphs (step S212). If there is still a divided feature graph on which the process is not yet performed (No at step S212), the estimation result matching determination unit 15 returns to step S208.

In contrast, if the determination process of the basis for estimation is completed for all the divided feature graphs (Yes at step S212), the estimation result matching determination unit 15 outputs the information on the divided feature graph adopted as the basis for estimation to the basis generation unit 16. The basis generation unit 16 generates the basis information on each divided feature graph adopted as the basis for estimation (step S213).

The basis generation unit 16 outputs the basis information on each divided feature graph adopted as the basis for estimation, to the basis synthesis unit 17. The basis synthesis unit 17 synthesizes the basis information on each divided feature graph adopted as the basis for estimation, and generates estimation result information that is information on the basis for estimation of the estimation result of the data to be estimated (step S214).

Subsequently, the basis synthesis unit 17 transmits the estimation result information indicating the basis for estimation of the estimation result of the data to be estimated to the user terminal 4, and provides the user with the information on the estimation result (step S215).

Figure 8:
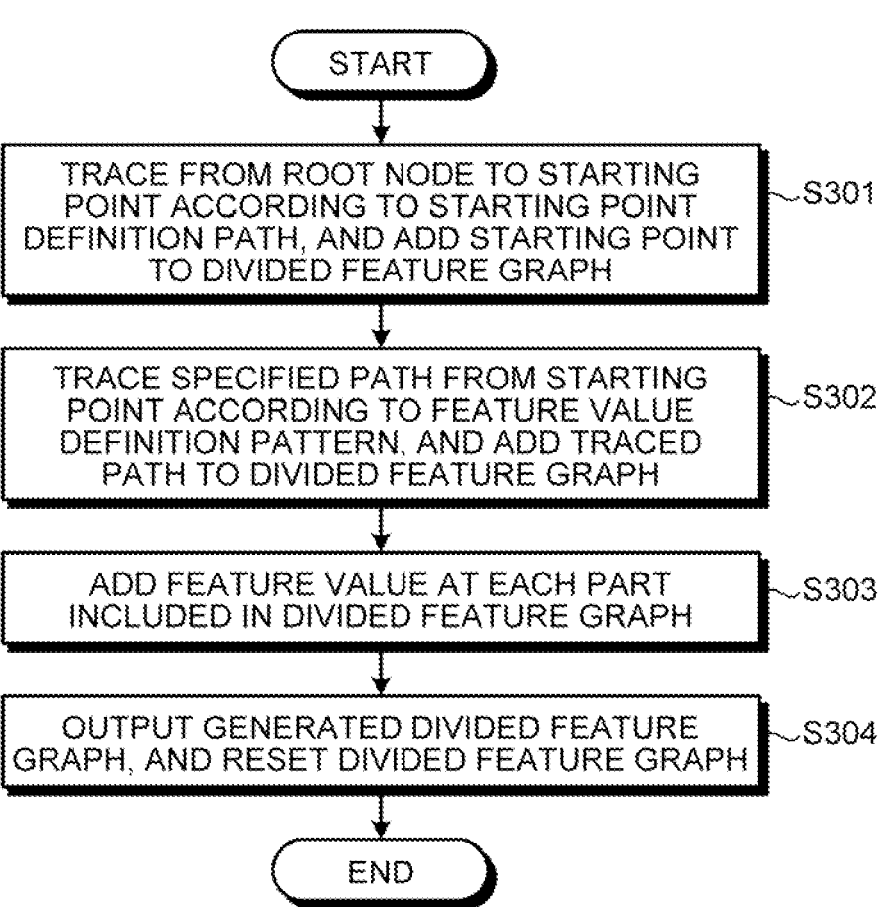
FIG. 8 is a flowchart of a feature graph division process.

FIG. 8 is a flowchart of the feature graph division process. The process illustrated in the flowchart in FIG. 8 is an example of the process performed at step S106 in FIG. 6 and step S204 in FIG. 7. Hereinafter, with reference to FIG. 8, the flow of the feature graph division process by the feature value division unit 12 will be described.

According to a starting point definition path included in the selected division definition, the feature value division unit 12 traces a path from a root node to a specified starting point, and adds the starting point to the divided feature graph (step S301).

Next, according to a feature value definition pattern included in the selected division definition, the feature value division unit 12 traces the specified path from the starting point, and adds the traced path to the divided feature graph (step S302). In other words, the feature value division unit 12 adds information on parts present on the traced path and the path from the starting point of each part, to the divided feature graph.

Next, the feature value division unit 12 adds the feature value at each part included in the divided feature graph that is being generated, to the divided feature graph (step S303).

Subsequently, the feature value division unit 12 outputs the generated divided feature graph, and resets the divided feature graph afterward (step S304).

Hardware Configuration

Figure 9:
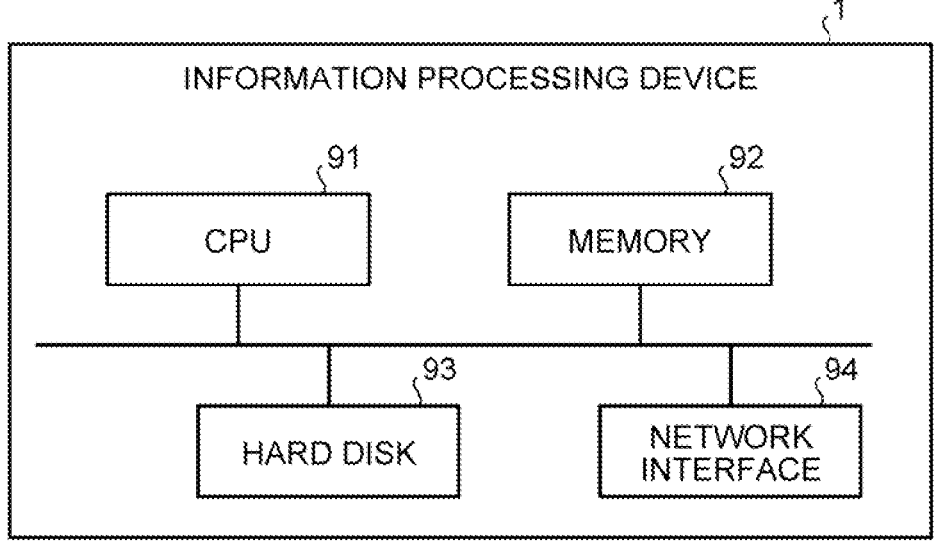
FIG. 9 is a hardware configuration diagram of the information processing device.

FIG. 9 is a hardware configuration diagram of the information processing device. Next, with reference to FIG. 9, an example of the hardware configuration for implementing the functions of the information processing device 1 will be described.

As illustrated in FIG. 9, for example, the information processing device 1 includes a Central Processing Unit (CPU) 91, a memory 92, a hard disk 93, and a network interface 94. The CPU 91 is connected to the memory 92, the hard disk 93, and the network interface 94 via a bus.

The network interface 94 is an interface for communication between the information processing device 1 and an external device. For example, the network interface 94 relays communication between the CPU 91, the database 2, the input terminal 3, and the user terminal 4.

The hard disk 93 is an auxiliary storage device. The hard disk 93 stores therein various computer programs. The various computer programs include computer programs for implementing the functions of the feature value extraction unit 11, the feature value division unit 12, the training unit 13, the estimation unit 14, the estimation result matching determination unit 15, the basis generation unit 16, and the basis synthesis unit 17 illustrated in FIG. 1.

The memory 92 is a main storage device. For example, a Dynamic Random-Access Memory (DRAM) may be used for the memory 92.

The CPU 91 reads various computer programs from the hard disk 93, loads the computer programs on the memory 92, and executes the computer programs. Consequently, the CPU 91 implements the functions of the feature value extraction unit 11, the feature value division unit 12, the training unit 13, the estimation unit 14, the estimation result matching determination unit 15, the basis generation unit 16, and the basis synthesis unit 17 illustrated in FIG. 1.

As described above, the information processing device according to the present embodiment divides the feature graph indicating each part and each feature value used for performing estimation on data, into divided feature graphs that is a collection of parts assumed to have similar functions. Then, the information processing device performs training for each divided feature graph, and generates a machine learning model for each divided feature graph. Subsequently, the information processing device performs estimation on the divided feature graph generated by dividing the feature graph of the data to be estimated, using the machine learning model for each divided feature graph, and acquires the estimation result of the data to be estimated from the estimation result. Then, by taking into account the matching of the estimation result of the data to be estimated and the estimation result obtained using the classification score for each divided feature graph, the information processing device determines whether to adopt each divided feature graph as the basis for estimation. Subsequently, the information processing device generates information on the basis for estimation of the estimation result of the data to be estimated using the adopted divided feature graph, and provides the user with the generated information.

In other words, the information processing device according to the present embodiment divides the feature values by function, classifies the functions, summarizes description of the functions that fall within the same classification, and describes the functions. Consequently, it is possible to summarize and integrally describe the functions that fall within the same classification as that of the estimation result, and improve the persuasiveness and reliability of the AI-based estimation.

First Modification

Next, a first modification will be described. An information processing device according to the present modification is also represented by the block diagram in FIG. 1. The information processing device 1 according to the present modification differs from the embodiment in that division is performed without using the division definition. In the following description, the description of the same function as that of each unit in the embodiment will be omitted.

The feature value division unit 12 receives the input of a feature graph of the training data from the feature value extraction unit 11. Next, the feature value division unit 12 divides the feature graph into the minimum unit. For example, the feature value division unit 12 generates divided feature graphs by dividing each part having a feature value as a single unit. Then, the feature value division unit 12 outputs the generated divided feature graphs to the training unit 13.

Subsequently, the feature value division unit 12 receives the input of information on divided feature graphs to be connected from the training unit 13. Then, the feature value division unit 12 selects one of the divided feature graphs linked to a part of the same upper-level hierarchy as that of the divided feature graph instructed to be connected, and connects the two divided feature graphs. Moreover, if there is no divided feature graph linked to the part of the same upper-level hierarchy, the feature value division unit 12 connects the divided feature graph instructed to be connected with the divided feature graph including the part of the upper level to which the former divided feature graph is linked. Then, the feature value division unit 12 outputs the divided feature graph connected to each piece of training data to the training unit 13.

The training unit 13 receives the input of the divided feature graphs obtained by dividing the feature graph into the minimum unit, from the feature value division unit 12. Next, the training unit 13 performs training using each divided feature graph. Subsequently, the training unit 13 calculates the estimation accuracy of the machine learning model of each divided feature graph that has already been trained.

If the estimation accuracy is less than an accuracy threshold, the training unit 13 outputs an instruction to connect the divided feature graph along with the information on the divided feature graph, to the feature value division unit 12. Subsequently, the training unit 13 receives the input of the divided feature graphs after being connected, including the divided feature graph instructed to be connected, from the feature value division unit 12. Then, the training unit 13 performs training using the connected divided feature graphs, and calculates the estimation accuracy. In this case, the training unit 13 discards the other divided feature graph not used for connecting the divided feature graph instructed to be connected, without using the graph as the divided feature graph, even if the estimation accuracy of the graph is already equal to or greater than the accuracy threshold.

The training unit 13 repeats the connection instruction, training, and calculation of estimation accuracy, until the estimation accuracy of all the divided feature graphs becomes equal to or greater than the accuracy threshold. When the estimation accuracy of all the divided feature graphs becomes equal to or greater than the accuracy threshold, the training unit 13 outputs the machine learning model that has already been trained for each divided feature graph generated by the training using the divided feature graph at that point of time, to the estimation unit 14.

As described above, the information processing device according to the present modification automatically generates the divided feature graphs. Consequently, because the process of generating the division definition is eliminated, it is possible to reduce the processing load when the basis for estimation is to be provided.

Second Modification

Next, a second modification will be described. An information processing device according to the present modification performs estimation on data to be estimated using a machine learning model that is trained using a feature graph prior to division. In the following description, the description of the same function as that of each unit in the embodiment will be omitted.

In the training phase, the feature value division unit 12 outputs a feature graph prior to division to the training unit 13, along with divided feature graphs of training data. Moreover, in the estimation phase, the feature value division unit 12 outputs the feature graph prior to division to the estimation unit 14, along with divided feature graphs of data to be estimated.

The training unit 13 performs training using each divided feature graph. Moreover, the training unit 13 performs training using the feature graph prior to division, and generates a machine learning model that has already been trained for the feature graph prior to division. Then, the training unit 13 outputs the machine learning model that has already been trained for each divided feature graph and the machine learning model that has already been trained of the feature graph prior to division, to the estimation unit 14.

The estimation unit 14 receives the input of the divided feature graphs of the data to be estimated and the feature graph prior to division, from the feature value division unit 12. Then, the estimation unit 14 performs estimation on the data to be estimated, for the feature graph prior to division of the data to be estimated, using the machine learning model that has already been trained of the feature graph prior to division. Then, the estimation unit 14 outputs the estimation result of the data to be estimated to the user terminal 4.

Moreover, the estimation unit 14 performs estimation on the divided feature graphs of the data to be estimated, using the machine learning model that has already been trained for each divided feature graph, calculates the classification score for each classification in each divided feature graph, and outputs the calculated result to the estimation result matching determination unit 15. In this case, the estimation unit 14 does not have to use the estimation result of each divided feature graph to determine the estimation result of the data to be estimated.

The estimation result matching determination unit 15 compares between the estimation result of the data to be estimated obtained using the machine learning model for the feature graph prior to division and the estimation result of each divided feature graph obtained using the machine learning model for each divided feature graph, and determines whether to adopt each divided feature graph as the basis for estimation.

As described above, to perform estimation on the data to be estimated, the information processing device according to the present modification performs training by using the feature graph prior to division, and uses the machine learning model of the feature graph prior to division. Consequently, it is possible to improve the estimation accuracy of the information processing device. However, as described in the embodiment, the calculation cost is reduced when estimation is performed using the machine learning model for each divided feature graph, and the estimation result of the data to be estimated is obtained.

Third Modification

Figure 10:
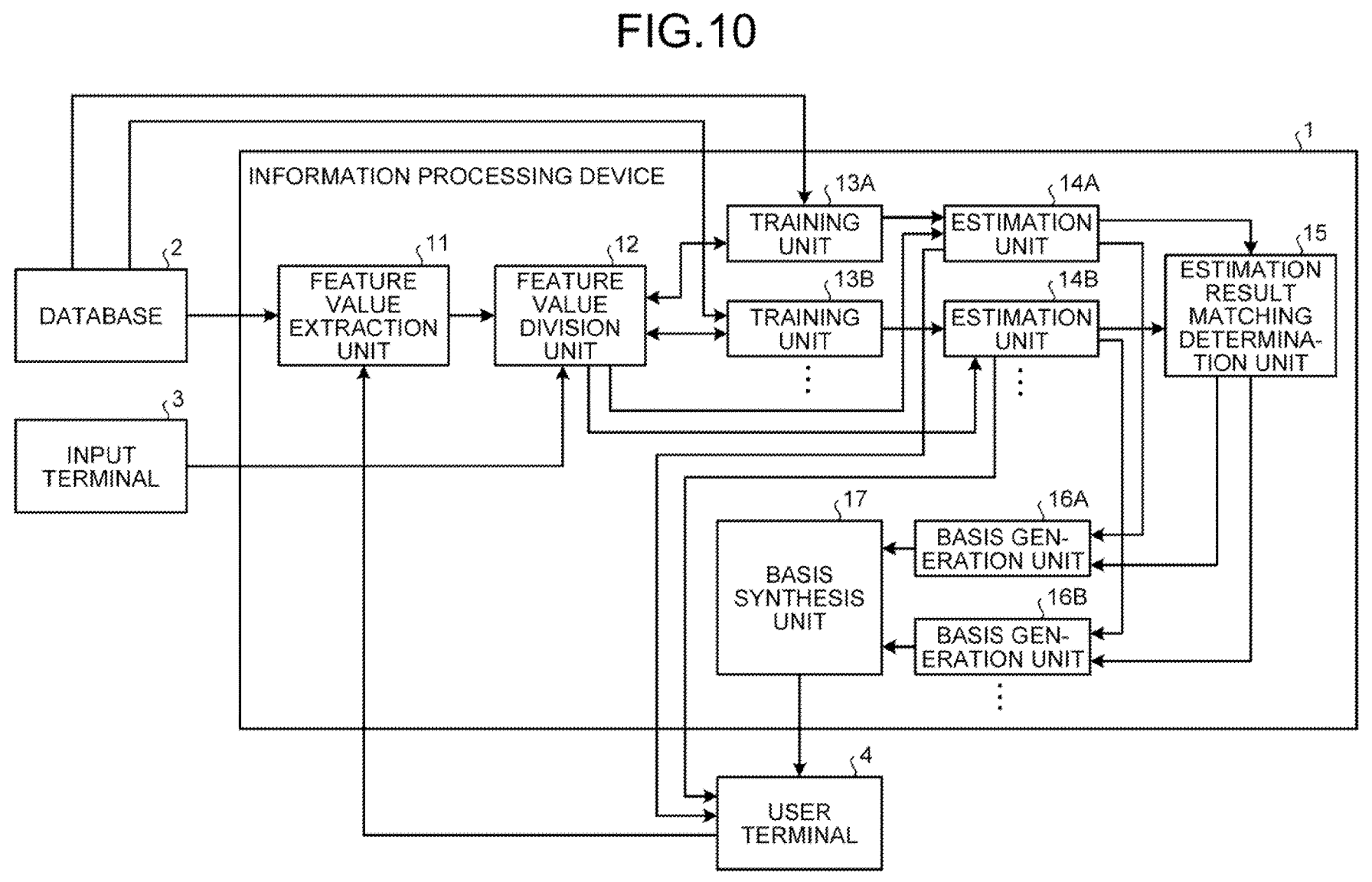

FIG. 10 is a block diagram of an information processing device according to a third modification. The information processing device 1 according to the present modification independently performs training, estimation, and basis generation for each divided feature graph. The information processing device 1 according to the present modification includes training units 13A, 13B, . . . , estimation units 14A, 14B, . . . , and basis generation units 16A, 16B, . . . . In the following description, the description of the same function as that of each unit in the embodiment will be omitted.

For example, the training unit 13A acquires the divided feature graph 101 including the "head" and "forehead", and the feature values of the "head" and "forehead" in FIG. 3 for each piece of the training data. Then, the training unit 13A performs training using the divided feature graph 101 of each piece of the training data. Then, the training unit 13A outputs the machine learning model that has already been trained corresponding to the divided feature graph 101, to the estimation unit 14A.

For example, the training unit 13B acquires the divided feature graph 102 including the "eyes" and "mouth", and the feature values of the "eyes" and "mouth" in FIG. 3 for each piece of the training data. Then, the training unit 13B performs training using the divided feature graph 102 of each piece of the training data. Subsequently, the training unit 13B outputs the machine learning model that has already been trained corresponding to the divided feature graph 102 to the estimation unit 14B.

The training is also performed on the divided feature graphs 103 to 105 in FIG. 3 by other training units 13. In this example, among the training units 13A, 13B, . . . , the training units other than the training units 13A and 13B are referred to as the other training units 13. Subsequently, the other training units 13 that have performed training on the divided feature graphs 103 to 105, output the machine learning model that has already been trained corresponding to each of the divided feature graphs 103 to 105 to other estimation units 14. In this example, among the estimation units 14A, 14B, . . . , the estimation units other than the estimation units 14A and 14B are referred to as the other estimation units 14.

The estimation unit 14A performs estimation on the divided feature graph 101 for the data to be estimated, using the machine learning model that has already been trained corresponding to the divided feature graph 101. Then, the estimation unit 14A outputs the estimation result to the estimation result matching determination unit 15 and the basis generation unit 16A.

The estimation unit 14B performs estimation on the divided feature graph 102 for the data to be estimated, using the machine learning model that has already been trained corresponding to the divided feature graph 102. Then, the estimation unit 14B outputs the estimation result to the estimation result matching determination unit 15 and the basis generation unit 16B.

The other estimation units 14 perform estimation on the divided feature graphs 103 to 105 for the data to be estimated, using the machine learning model that has already been trained corresponding to each of the divided feature graphs 103 to 105. Then, the other estimation units 14 output the estimation result to the estimation result matching determination unit 15 and other basis generation units 16. In this example, among the basis generation units 16A, 16B, . . . , the basis generation units other than the basis generation units 16A and 16B are referred to as the other basis generation units 16.

For example, if the divided feature graphs 101 and 102 are adopted as the basis for estimation among the divided feature graphs 101 to 105, the basis generation units 16A and 16B receive notification that the divided feature graphs 101 and 102 are adopted as the basis for estimation, from the estimation result matching determination unit 15. Then, the basis generation unit 16A generates basis information from the estimation result of the divided feature graph 101 for the data to be estimated acquired from the estimation unit 14A. Moreover, the basis generation unit 16B generates basis information from the estimation result of the divided feature graph 101 for the data to be estimated acquired from the estimation unit 14A. The other basis generation units 16 in charge of the divided feature graphs 103 to 105 that have not been adopted as the basis for estimation, do not generate basis information.

The basis synthesis unit 17 generates the estimation result information that is information on the basis for estimation, based on the basis information acquired from the basis generation units 16A and 16B, transmits the generated information to the user terminal 4, and provides the user with the generated information.

As described above, the information processing device according to the present modification performs training, estimation, and generation of basis information for each divided feature graph. For example, a different piece of hardware may be used to perform training, estimation, and generation of basis information for each divided feature graph. Thus, even if training, estimation, and generation of basis information are performed for each divided feature graph, it is possible to summarize and integrally describe the functions that fall within the same classification as that of the estimation result, and improve the persuasiveness and reliability of the AI-based estimation.

In one aspect, the present invention can provide the basis for estimation that is highly persuasive and reliable.

All examples and conditional language recited herein are intended for pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

18

What is claimed is:

1. A non-transitory computer-readable recording medium having stored therein an information processing program that causes a computer to execute a process comprising:
dividing input data including a plurality of items into a plurality of groups based on a predetermined condition;
inputting the input data in each group into at least one machine learning model to acquire a first estimation result of a machine learning model for each group, the machine learning model for each group being trained to perform same classification using different features values generated from the plurality of items in training data each divided into respective groups;
determining a second estimation result based on the first estimation result of each of the plurality of groups; and
generating a basis for estimation of the second estimation result by acquiring a classification score that indicates a probability of obtaining a correct answer for each classification in the first estimation result, and by using an item in the plurality of items that is used as a feature value in training the machine learning model corresponding to a group of which the classification score for the classification that matches with the second estimation result is equal to or greater than a threshold.

2. The non-transitory computer-readable recording medium according to claim 1, wherein the group is divided based on a division definition that defines a set of items to be similar bases for estimation.

3. The non-transitory computer-readable recording medium according to claim 1, wherein
input data for training including the items related to training data used for training a machine learning model is classified into a plurality of training groups based on the predetermined condition, and
the machine learning model that has already been trained is generated by performing training using the classified training group.

4. An information processing method comprising:
dividing input data including a plurality of items into a plurality of groups based on a predetermined condition;
inputting the input data in each group into at least one machine learning model to acquire a first estimation result of a machine learning model for each group, the machine learning model for each group being trained to perform same classification using different features values generated from the plurality of items in training data each divided into respective groups;
determining a second estimation result based on the first estimation result of each of the plurality of groups; and
generating a basis for estimation of the second estimation result by acquiring a classification score that indicates a probability of obtaining a correct answer for each classification in the first estimation result, and by using an item in the plurality of items that is used as a feature value in training the machine learning model corresponding to a group of which the classification score for the classification that matches with the second estimation result is equal to or greater than a threshold.

5. An information processing device comprising:
a memory; and
a processor coupled to the memory and configured to:
divide input data including a plurality of items into a plurality of groups based on a predetermined condition;
input the input data in each group into at least one machine learning model to acquire a first estimation result of a machine learning model for each group, the machine learning model for each group being trained to perform same classification using different features values generated from the plurality of items in training data each divided into respective groups;

determine a second estimation result based on the first estimation result of each of the plurality of groups; and generate a basis for estimation of the second estimation result by acquiring a classification score that indicates a probability of obtaining a correct answer for each classification in the first estimation result, and by using an item in the plurality of items that is used as a feature value in training the machine learning model corresponding to a group of which the classification score for the classification that matches with the second estimation result is equal to or greater than a threshold.

* * * * *